United States Patent
Akhteruzzaman et al.

(10) Patent No.: US 6,263,068 B1
(45) Date of Patent: Jul. 17, 2001

(54) REMOTE SUBSCRIBER LINE UNIT PROVISIONING SYSTEM FOR USE WITH VOICE COMMUNICATION FACILITIES

(75) Inventors: Akhteruzzaman, Naperville; Paul Raymond Sand, Woodridge, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/197,652

(22) Filed: Nov. 23, 1998

(51) Int. Cl.$^7$ .................................................. H04M 3/00
(52) U.S. Cl. ............................................. 379/334; 379/201
(58) Field of Search .................................... 379/334, 201, 379/220, 221

(56) References Cited

U.S. PATENT DOCUMENTS 4,230,913 * 10/1980 Brotheis et al. ................. 379/334 X
5,287,344 * 2/1994 Bye et al. ......................... 379/334 X
5,680,391    10/1997 Barron et al. .
5,761,292 * 6/1998 Wagner et al. ....................... 379/229

FOREIGN PATENT DOCUMENTS 198 26 631   12/1999  (DE) .
WO97/35404    9/1997  (WO) .

* cited by examiner

Primary Examiner—Creighton Smith
(74) Attorney, Agent, or Firm—Duft, Graziano & Forest, P.C.

(57) ABSTRACT

The remote subscriber line unit provisioning system which operates on a shared facilities basis with the voice communication facilities of the remote subscriber line unit. This architecture eliminates the need for dedicated communication facilities to interconnect the remote subscriber line unit with the central facilities management system.

12 Claims, 3 Drawing Sheets

REMOTE SUBSCRIBER LINE UNIT PROVISIONING SYSTEM FOR USE WITH VOICE COMMUNICATION FACILITIES

FIELD OF THE INVENTION

This invention relates to telecommunication systems and, in particular, to a system that functions to provision remote subscriber line units via the same facilities that are used by the remote subscriber line units for voice communication connections.

Problem

It is a problem in the field of remote subscriber line units to administer the facilities that are included in such units in an inexpensive and efficient manner. In particular, the remote subscriber line unit comprises a plurality of subscriber line interfaces, each of which serves a particular subscriber equipment, that are concentrated into a smaller number of communication facilities to connect the subscriber equipment to the central office switch. The remote subscriber line unit must be "provisioned" on an infrequent basis to perform maintenance, administration, and usage monitoring functions. The provisioning of the remote subscriber line unit is typically effected by the use of a dedicated line that connects the remote subscriber line unit to the administrative facilities of the central office switch. The administrative facilities comprise a separate data network that serves to interconnect a large number of remote subscriber line units and other such equipment to a central facilities management system.

The use of the separate data network and dedicated communication facilities to interconnect the remote subscriber line units to the central facilities management system is an expensive architecture and requires the dedication of a separate provisioning line for each remote subscriber line unit. The dedicated line diminishes the number of subscriber equipments that can be served by the remote subscriber line unit and such a system incurs the cost of maintenance for facilities that are used on an infrequent basis. Furthermore, the communication interfaces that are used in this provisioning network are proprietary in nature and unavailable for use by other than the serving common carrier. Thus, the present architecture for provisioning remote subscriber line units is expensive to implement and operate.

Solution

The above described problems are solved and a technical advance achieved by the present remote subscriber line unit provisioning system which operates on a shared facilities basis with the voice communication facilities of the remote subscriber line unit. This architecture eliminates the need for dedicated communication facilities to interconnect the remote subscriber line unit with the central facilities management system and thereby removes the dependence on a proprietary interface, since the standard voice interface of the remote subscriber line unit is used for provisioning.

DETAILED DESCRIPTION

The remote subscriber line unit comprises a plurality of subscriber line interfaces, each of which serves a particular subscriber equipment, that are concentrated into a smaller number of communication facilities to connect the subscriber equipment to the central office switch. The remote subscriber line unit must be "provisioned" on an infrequent basis to perform remote maintenance, facilities administration, and usage monitoring functions. The remote subscriber line units typically function as concentrators and are commonly found in the common carrier environment, under various trade names such as SLC, RISLUs, RAIU, and the like.

Existing Remote Subscriber Line Unit Provisioning Architecture

Figure 2:
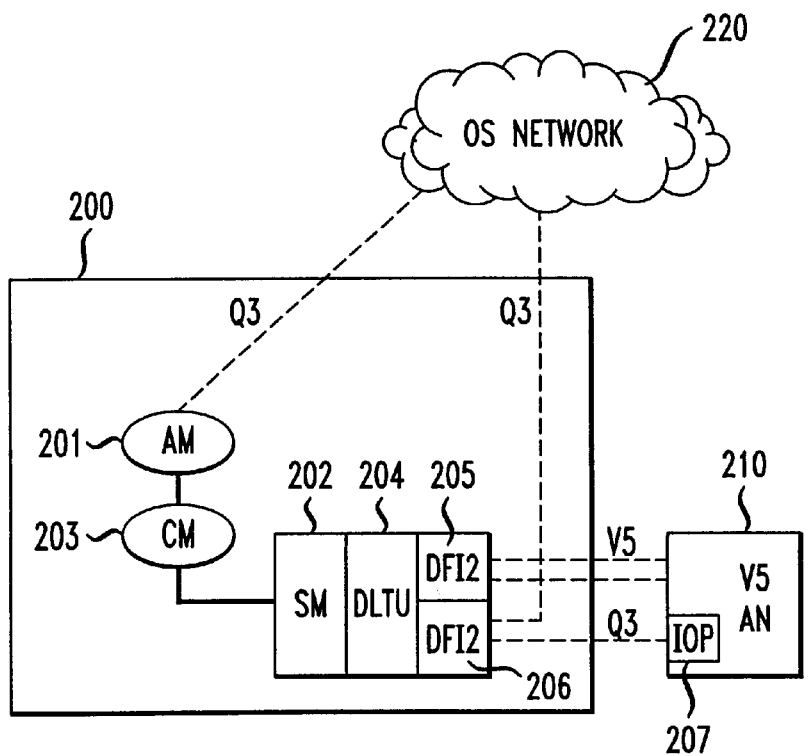
FIGS. 2-4 illustrate prior art remote subscriber line unit provisioning architectures.
Figure 3:
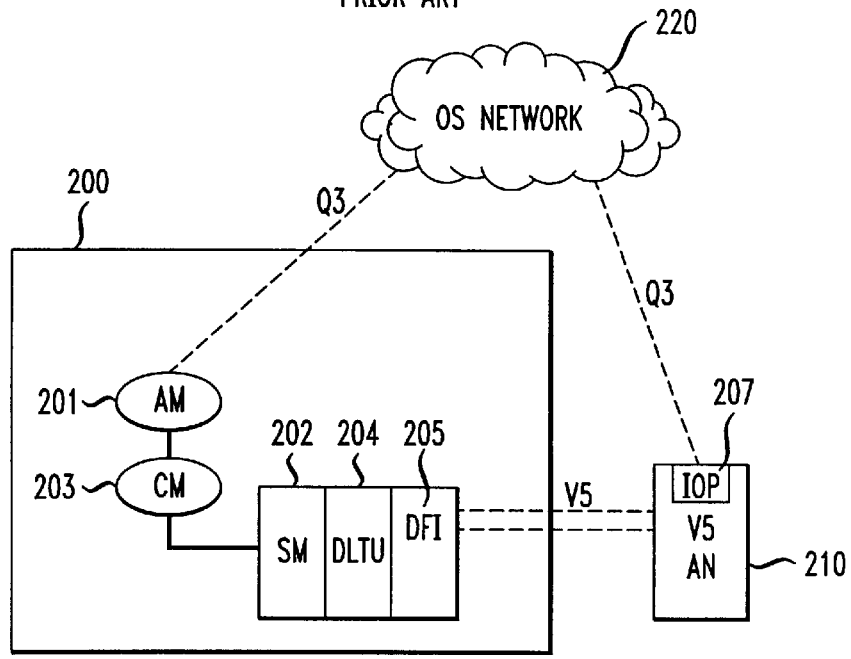
Figure 4:
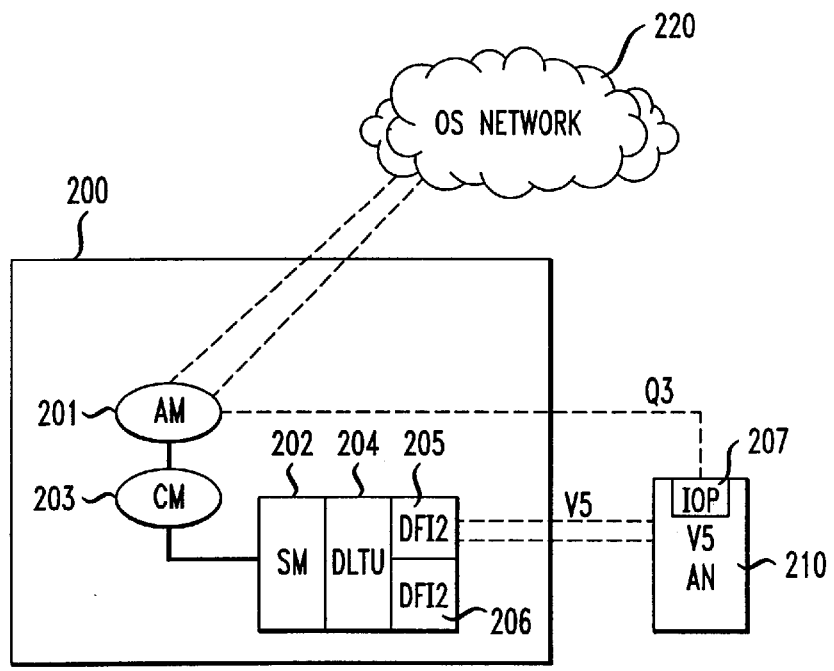

In prior art remote subscriber line unit provisioning systems, the basic architecture was implemented either as shown in FIGS. 2-4. For example, in FIG. 2, the central office switch 200 that serves the remote subscriber line unit 210 includes a plurality of elements. The administration module 201 is connected to the switch module 202 via the communication module 203. The switch module 202 serves to manage the communication connections through the central office switch 200 and in particular to the digital line trunk unit 204 which serves to interface a plurality of digital facilities interfaces 205, 206 with the switch fabric, in well known fashion. The digital facilities interface 205 implements the V5 protocol, which is a call processing protocol used to initiate communication connections between the remote subscriber line unit 210 and the central office switch 200. The provisioning of the remote subscriber line unit 210 in this architecture is effected by the use of a separate set of facilities that comprise a digital facilities interface 206 that interconnects the remote subscriber line unit 210 with the operations systems network 220 via the use of a maintenance protocol, such a Q3 as well as an Input/Output Port 207 of the remote subscriber line unit 210. The operations systems network 220 establishes data communication connections between the remote subscriber line unit 210 and the administration module 201 of the central office switch 200 to enable the remote subscriber line unit 210 to be maintained by the craftspeople, who are typically located at the central office switch 200, or some other remote location that is served by the operations center. The communication connection from operations system network 220 is through a separate data network to reach the remote subscriber line unit 210, therefore requiring additional transmission facilities and utilizing one of the ports of the remote systems network 220 subscriber line unit 210 to the exclusion of another voice port. Alternatively, the remote subscriber line unit 210 can be directly connected to the operations systems network 220 via dedicated facilities as shown in FIG. 3 or the remote subscriber line unit 210 can be directly connected to the administration module 201 via dedicated facilities as shown in FIG. 4.

All of these systems require the use of dedicated communication facilities to interconnect the administrative module 201 with the Input/Output Port 207 of remote subscriber line unit 210, either directly or through the remote systems network 220. The use of the separate data network and dedicated communication facilities to interconnect the remote subscriber line units to the central facilities management system is an expensive architecture and requires the dedication of a separate provisioning line for each remote subscriber line unit 210. The dedicated line diminishes the number of subscriber equipments that can be served by the remote subscriber line unit and such a system incurs the cost of maintenance for facilities that are used on an infrequent basis. Furthermore, the use of a single dedicated line for the provisioning process presents a single point of failure, such that if the dedicated provisioning line fails, the provisioning function cannot be effected. Thus, the present architecture for provisioning remote subscriber line units is expensive to implement and operate, and suffers from reliability limitations.

Remote Subscriber Line Unit Provisioning System

Figure 1:
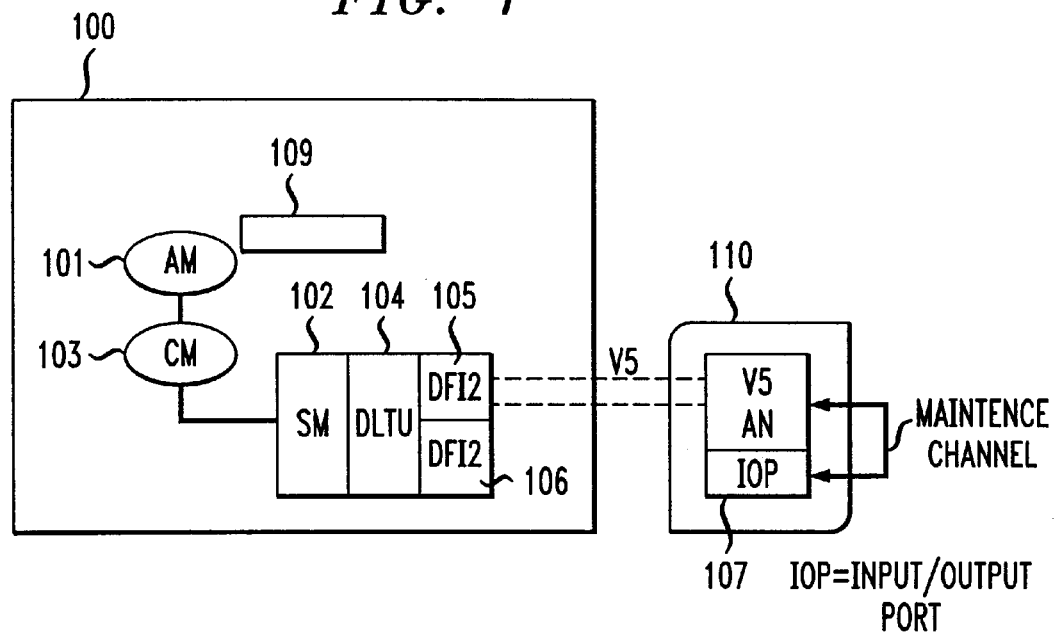
FIG. 1 illustrates in block diagram form the overall architecture of the present remote subscriber line unit provisioning system.

In order to eliminate the need for dedicated communication facilities to provide the provisioning service, the architecture of FIG. 1 is used to implement the present remote subscriber line unit provisioning system 109. This remote subscriber line unit provisioning system 109 operates as part of the administrative facilities of the remote subscriber line unit 110. This architecture eliminates the need for dedicated communication facilities to interconnect the remote subscriber line unit 110 with the administrative module 101. The present remote subscriber line unit provisioning system 109 uses existing voice lines which dynamically intermix the maintenance data transmission with the voice transmission. The voice channels are not a proprietary interface and is defined in the industry standard as V5.2 voice interface specification. The administration module 101 also communicates with the communications module 102 to manage the voice communication facilities that are located in the central office switch 100.

Figure 5:
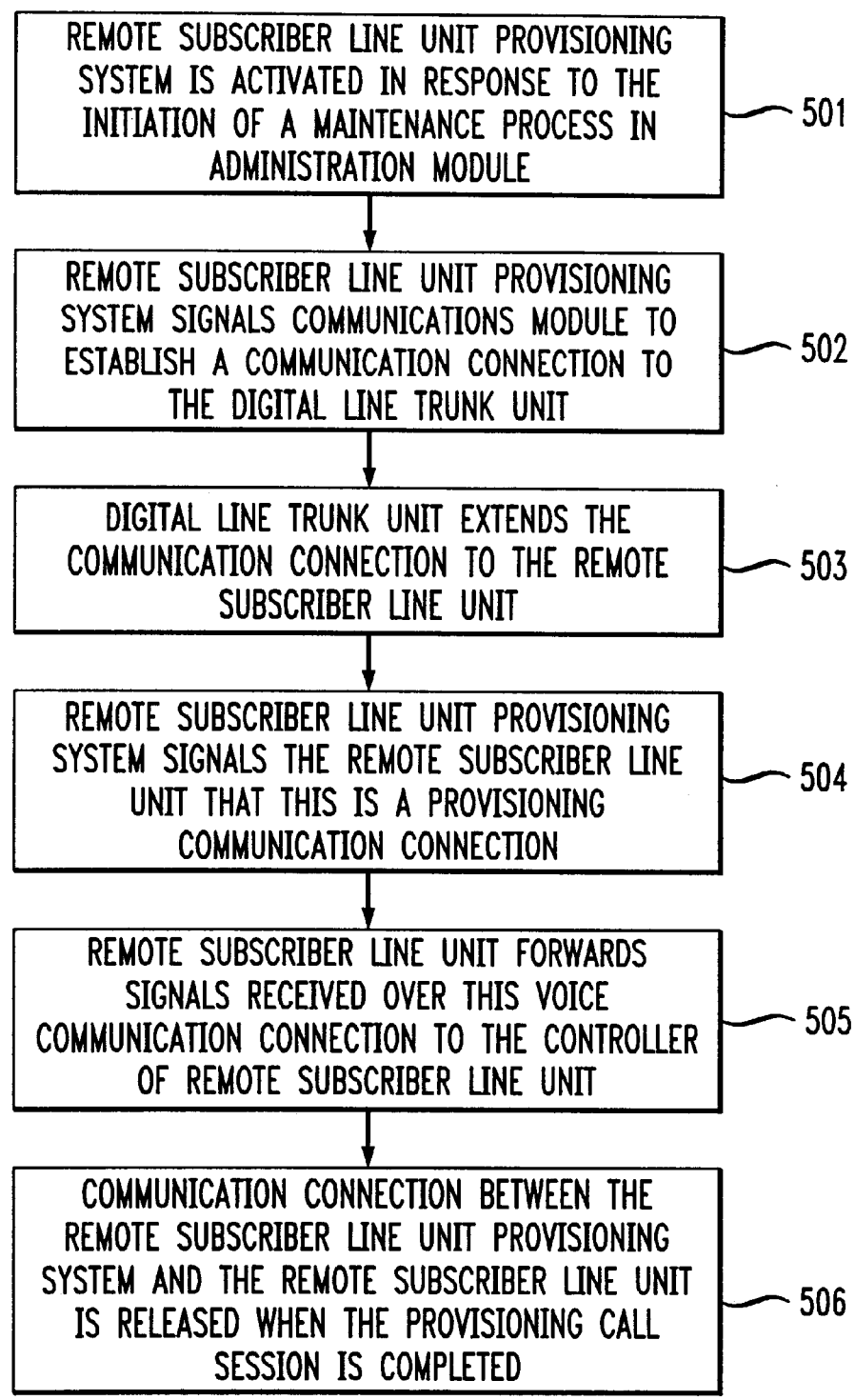
FIG. 5 illustrates in flow diagram form the operation of the present remote subscriber line unit provisioning system.

FIG. 5 illustrates in flow diagram from the operation of the present remote subscriber line unit provisioning system 109. In particular, at step 501, the remote subscriber line unit provisioning system 109 is activated in response to the initiation of a maintenance process in administration module 101. The remote subscriber line unit provisioning system 109 at step 502 signals communications module 103 to establish a communication connection through switch module 102 to the digital line trunk unit 104 which serves to interface a plurality of digital facilities interfaces 105, 106 with the switch fabric, in well known fashion. The digital facilities interface 105 implements the V5 protocol, which is a call processing protocol used to initiate communication connection between the remote subscriber line unit 110 and the central office switch 100. At step 503, the digital line trunk unit 104 extends the communication connection over a selected standard voice communication channel of digital facilities interface 105 to the remote subscriber line unit 110, as with a voice communication connection. Once the voice communication connection is in place between the remote subscriber line unit provisioning system 109 and the remote subscriber line unit 110, at step 504 the remote subscriber line unit provisioning system 109 signals the remote subscriber line unit 110 that this is a provisioning communication connection. At step 505, the remote subscriber line unit 110 forwards signals received over this voice communication connection to the controller of remote subscriber line unit 110 via a maintenance channel on the U or Z interface of the Input/Output Port 207. Thus, the initial communication connection is processed as with a standard voice call, then switched to a provisioning call connection once the common voice communication facilities are in place to carry the data communications between the remote subscriber line unit provisioning system 109 and the controller of the remote subscriber line unit 110. At step 506 when the provisioning call session is completed, the communication connection between the remote subscriber line unit provisioning system 109 and the remote subscriber line unit 110 is released for voice communication connections.

Thus, all of the communication paths between the remote subscriber line unit and the central office switch 100 are available for use in voice communication connections. in addition, all of the communication paths between the remote subscriber line unit and the central office switch 100 are also available for use in the provisioning process. Thus, this system avoid the need for dedicated facilities to implement the provisioning function for remote subscriber line units and achieves increased reliability by using any selected one of a plurality of available communication facilities to process the provisioning communication connection.

What is claimed:

1. A remote subscriber line unit provisioning system for interconnecting an administrative module, located remotely from a remote subscriber line unit, with said remote subscriber line unit, wherein said remote subscriber line unit is connected to a switch fabric located in a local central office switch by a plurality of communication lines, comprising:

means for interconnecting said administrative module with said switch fabric of said local central office switch; and means for initiating a voice communication connection from said administrative module through said switch fabric to said remote subscriber line unit over a selected one of said plurality of communication lines.

2. The remote subscriber line unit provisioning system of claim 1 further comprising:

means, responsive to establishment of a voice communication connection from said administrative module through said switch fabric to said remote subscriber line unit over a selected one of said plurality of communication lines, for initiating a data communication session with a controller located in said remote subscriber line unit.

3. The remote subscriber line unit provisioning system of claim 2 wherein said remote subscriber line unit implements a standard voice interface over said plurality of communication lines, and said controller implements a data communication interface, further comprising:

means, responsive to said initiated data communication session, for implementing a data communication interface on said voice communication connection to said controller of said remote subscriber line unit.

4. The remote subscriber line unit provisioning system of claim 1 wherein the means for interconnecting comprises:

means for implementing a standard voice interface with said switch fabric of said local central office switch.

5. The remote subscriber line unit provisioning system of claim 4 further comprising:

means, responsive to establishment of a voice communication connection from said administrative module through said switch fabric to said remote subscriber line unit over a selected one of said plurality of communication lines, for implementing a data communication interface on said voice communication connection to said remote subscriber line unit.

6. A method of operating a remote subscriber line unit provisioning system for interconnecting an administrative module, located remotely from a remote subscriber line unit, with said remote subscriber line unit, wherein said remote subscriber line unit is connected to a switch fabric located in a local central office switch by a plurality of communication lines, comprising the steps of:

interconnecting said administrative module with said switch fabric of said local central office switch; and initiating a voice communication connection from said administrative module through said switch fabric to said remote subscriber line unit over a selected one of said plurality of communication lines.

7. The method of operating a remote subscriber line unit provisioning system of claim 6 further comprising:

initiating, in response to establishment of a voice communication connection from said administrative module through said switch fabric to said remote subscriber line unit over a selected one of said plurality of communication lines, a data communication session with a controller located in said remote subscriber line unit.

8. The method of operating a remote subscriber line unit provisioning system of claim 7 wherein said remote subscriber line unit implements a standard voice interface over said plurality of communication lines, and said controller implements a data communication interface, further comprising:

implementing, in response to said initiated data communication session, a data communication interface on said voice communication connection to said controller of said remote subscriber line unit.

9. The method of operating a remote subscriber line unit provisioning system of claim 6 wherein said step of interconnecting comprises:

implementing a standard voice interface with said switch fabric of said local central office switch.

10. The method of operating a remote subscriber line unit provisioning system of claim 9 further comprising:

implementing, in response to establishment of a voice communication connection from said administrative module through said switch fabric to said remote subscriber line unit over a selected one of said plurality of communication lines, a data communication interface on said voice communication connection to said remote subscriber line unit.

11. A remote subscriber line unit provisioning system for interconnecting an administrative module, located remotely from a remote subscriber line unit, with said remote subscriber line unit, to enable provisioning of said remote subscriber line unit from said administrative module, wherein said remote subscriber line unit is connected to a switch fabric located in a local central office switch by a plurality of communication lines, comprising:

communication module means for interconnecting said administrative module with said switch fabric of said local central office switch;

switch module means for implementing a voice communication interface with said switch fabric;

remote subscriber line unit provisioning means for initiating a voice communication connection from said administrative module through said switch module means and said switch fabric to said remote subscriber line unit over a selected one of said plurality of communication lines; and wherein said remote subscriber line unit provisioning means is responsive to establishment of a voice communication connection from said administrative module through said switch fabric to said remote subscriber line unit over a selected one of said plurality of communication lines, for initiating a data communication session with a controller located in said remote subscriber line unit.

12. The remote subscriber line unit provisioning system of claim 11 wherein said remote subscriber line unit implements a standard voice interface over said plurality of communication lines, and said controller implements a data communication interface, further comprising:

maintenance channel means, responsive to said initiated data communication session, for implementing a data communication interface on said voice communication connection to said controller of said remote subscriber line unit.

\* \* \* \* \*